US005138400A

United States Patent [19]

Kurosawa

[11] Patent Number: 5,138,400

[45] Date of Patent: Aug. 11, 1992

[54] IMAGE FORMING APPARATUS

[75] Inventor: Norio Kurosawa, Tokyo, Japan

[73] Assignee: Kabushiki Kaisha Toshiba, Kanagawa, Japan

[21] Appl. No.: 791,478

[22] Filed: Nov. 12, 1991

[30] Foreign Application Priority Data

Nov. 29, 1990 [JP] Japan .................................. 2-332548

[51] Int. Cl.[5] ........................ G03B 27/34; G03B 27/40

[52] U.S. Cl. .......................................... 355/56; 355/61

[58] Field of Search ........................ 355/55, 56, 57, 61

[56] References Cited

U.S. PATENT DOCUMENTS 4,641,953 2/1987 Oushiden et al. ..................... 355/55
4,650,317 3/1987 Oushiden et al. ..................... 355/57

Primary Examiner—Monroe H. Hayes

Attorney, Agent, or Firm—Philip M. Shaw, Jr.

[57] ABSTRACT

An image forming apparatus including a copy image forming section for forming a copy image on the basis of an original image under each of a plurality of image forming conditions including a plurality of magnification ratios, a first key for inputing the change of magnification ratio from first magnification ratio to second magnification ratio, a second key for inputing one of the image forming conditions and a microprocessor for setting the second magnification ratio to the magnification ratio in accordance with first changing ratio when only the first key is operated and for setting the second magnification ratio to the magnification ratio in accordance with second changing ratio different from the first changing ratio when both the first key and the second key are operated.

17 Claims, 5 Drawing Sheets

IMAGE FORMING APPARATUS

FIELD OF THE INVENTION

The present invention relates generally to an image forming apparatus, and more particularly, to an image forming apparatus having a function for forming enlarged or reduced images.

BACKGROUND OF THE INVENTION

In recent years, image forming apparatus such as copying machines with a multi-stage image magnifying function or a continuous change image magnifying function for forming enlarged or reduced images have been widely used. For example, the U.S. Pat. No. 4,650,317 discloses a copying machine with such a multi-stage image magnifying function and a continuous change image magnifying function.

In the prior art, there are shown a set of magnification up and down keys and a plurality of specific magnification keys. The magnification up and down keys are adapted for continuously increasing and decreasing the current magnification ratio. While the specific magnification keys are adapted for individually selecting a specific magnification ratio from a prescribed number of magnification ratios, e.g., 65%, 78%, 96%, 100% and 122 %. In these image magnifying functions of the prior art, when maximum or minimum magnification ratio is requested, an operator must keep depressing relatively long the magnification up key or the magnification down key, even if he or she has operated the 122 % key or the 65 % key.

Therefore, conventional image forming apparatus such as the copying machine disclosed in the U.S. Pat. No. 4,650,317 were inconvenient for quickly setting the maximum and minimum magnifying ratios, or magnification ratios close to the maximum and the minimum magnification ratios. The specific magnification keys of U.S. Pat. No. 4,650,317 are effective for quickly setting such several intermediate magnification ratios, but they disadvantageously make the construction of a control panel complicated.

SUMMARY OF THE INVENTION

It is, therefore, an object of the present invention is to provide an image forming apparatus which is able to quickly set a desired image magnification ratio, even when the desired image magnification ratio is a maximum or minimum image magnification ratio.

In order to achieve the above object, an image forming apparatus according to one aspect of the present invention includes a copy image forming section for forming a copy image on the basis of an original image under each of a plurality of image forming conditions including a plurality of magnification ratios, a first key for inputing the change of magnification ratio from first magnification ratio to second magnification ratio, a second key for inputing one of the image forming conditions and a microprocessor for setting the second magnification ratio to the magnification ratio in accordance with first changing ratio when only the first key is operated and for setting the second magnification ratio to the magnification ratio in accordance with second changing ratio different from the first changing ratio when both the first key and the second key are operated.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendent advantages thereof will be readily obtained as the same becomes better understood by reference to the following detailed description when considered in connection with the accompanying drawings, wherein.

DESCRIPTION OF THE PREFERRED EMBODIMENTS

The present invention will be described in detail with reference to the FIGS. 1 through 4.

Figure 1:
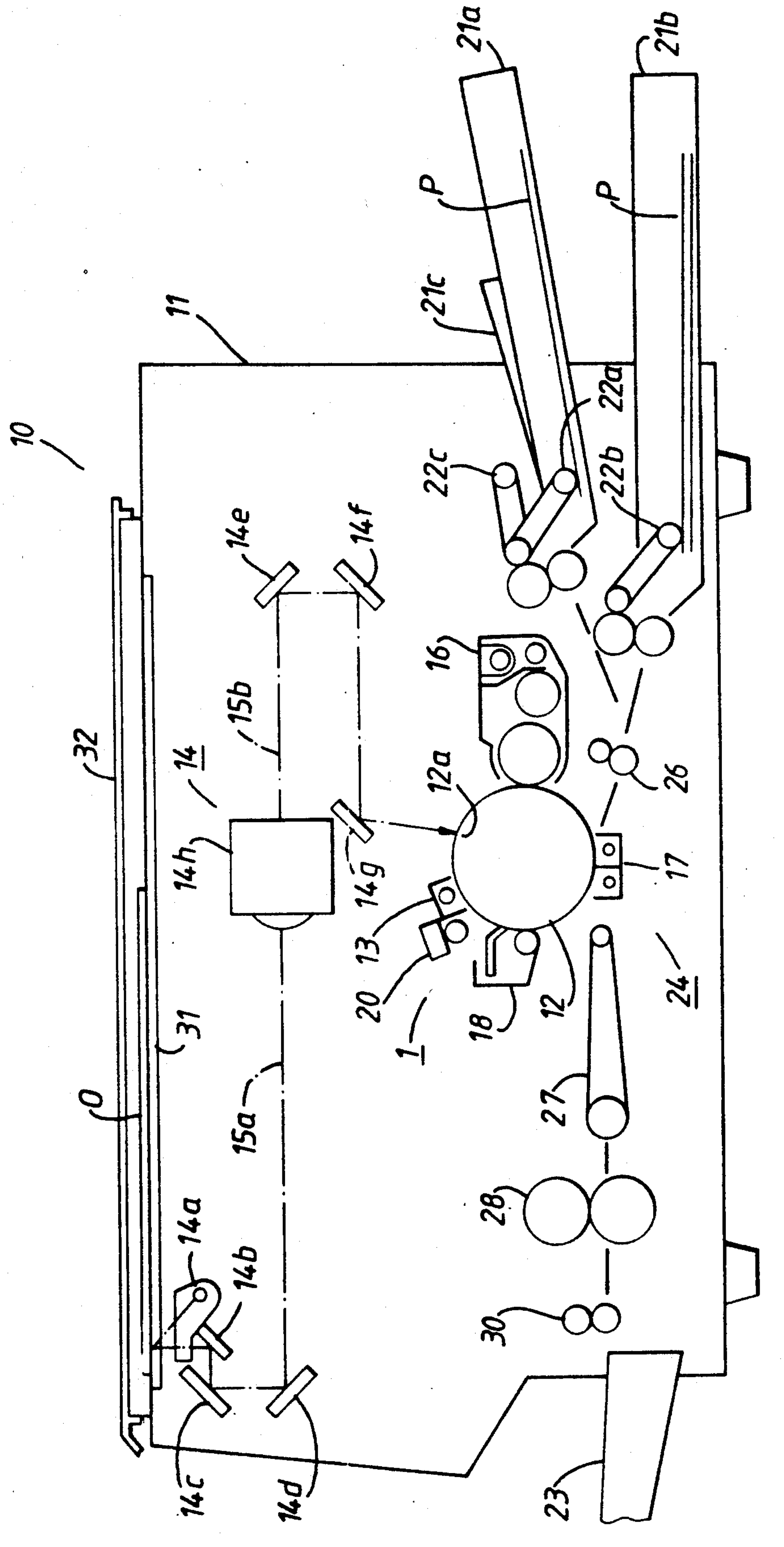
FIG. 1 is a section of an embodiment of the image forming apparatus according to the present invention.

Referring now to FIG. 1, an embodiment of the image forming apparatus according to the present invention will be described in detail. FIG. 1 is a section of the image forming apparatus now designated by reference numeral 10. The image forming apparatus 10 comprises a main body 11 and a platen cover 32. The top of the main body 11 is provided with a platen glass 31 for supporting an original 0. The platen cover 32 is hinged to the main body 11 so that the platen cover 32 selectively covers the platen glass 31.

The main body 11 houses an image forming section 1 for forming images and an image magnifying system, which will be described in detail later. The image forming section 1 is positioned at a generally central portion of the main body 11.

The image forming section 1 comprises a photosensitive drum 12, a charger 13, an optical system 14 for exposing an exposing position 12*a* on the photosensitive drum 12, an image developing device 16, an image transfer device 17, a drum cleaning device 18 and a charge removing device 20. The photosensitive drum 12 is rotatable in the clockwise direction in the drawing in an image forming operation. The charger 13, the image developing device 16, the image transfer device 17, the drum cleaning device 18 and the charge removing device 20 are stationarily disposed and aligned with each other in a circumference of the photosensitive drum 12. The optical system 14 is disposed above the photosensitive drum 12.

The charger 13 uniformly charges an electric charge on a surface portion of the photosensitive drum 12 facing to the charger 13. The surface portion thus charged reaches an exposing portion 12*a* on the photosensitive drum 12, which faces to the optical system 14. The optical system 14 applies a light reflected from the original 0 laid on the platen glass 31 to the exposing portion 12*a*. Thus, the electric charge on the exposing portion 12*a* of the photosensitive drum 12 is selectively removed to form a latent image corresponding to an image of the original 0. Details of the optical system 14 will be described later.

The image developing device 16 applies toner particles on the surface thus having the latent image so that a toner image corresponding to latent image is developed. The image transfer device 17 transfers the toner image from the photosensitive drum 12 to a paper sheet P fed to the image forming section 1. The drum cleaning device 18 cleans off a residual toners from the surface of the photosensitive drum 12. The charge removing device 20 removes a residual charge from the surface of the photosensitive drum 12 for a next image forming operation. Operations of the individual devices of the image forming section 1 are well-known in the art, so that details of the operations will be omitted.

The optical system 14 comprises an exposure lamp 14*a*, a set of mirrors, i.e., first to sixth mirrors 14*b* to 14*g* and a lens unit 14*h*. The exposure lamp 14*a* radiates a light onto the original 0 laid on the platen glass 31. The light radiated to the original 0 is reflected and applied to the set of mirrors 14*b* to 14*g* in turn. The lens unit 14*h* is disposed between the third mirror 14*d* and the fourth mirror 14*e* for focusing the light onto the exposing portion 12*a* on the photosensitive drum 12. Further the lens unit 14*h* is movable along a light path between the third and fourth mirrors 14*d* and 14*e* for magnifying or zooming up or down the image on the original 0 as described in detail later, so that an enlarged or reduced latent image is formed on the photosensitive drum 12. Finally the enlarged or reduced toner image is transferred on the paper sheet P by the magnifying function.

The exposure lamp 14*a* and the first to third mirrors 14*b*, 14*c*, 14*d* are mounted on a scanner (not shown) which travels along the platen glass 31. The scanner comprises a first carriage carrying the exposure lamp 14*a* and the first mirror 14*b* and a second carriage carrying the second and third mirrors 14*c* and 14*d*. The first and the second carriages move in synchronous with each other rightwardly in the drawing of FIG. 1 for optically scanning the original 0 laid on the platen glass 31, but the second carriage travels at a half speed of the first carriage.

the fourth to sixth mirrors 14*e*, 14*f* and 14*g* are stationarily disposed in the main body 11 for applying the reflected light from the third mirror 14*d* to the exposing portion 12*a* on the photosensitive drum 12.

Further the main body 11 is provided with a paper sheet inlet section, a paper sheet outlet section and a paper sheet transport system 24. The inlet section is formed at the right of the main body 11, while the outlet section is formed at the left of the main body 11. The paper sheet transport system 24 then couples the inlet section and the outlet section. In the inlet section cassettes 21*a* and 21*b* for storing paper sheets P with different sizes and a manual paper feeder 21*c* are removably attached. Also in the outlet section a paper sheet receiving tray 23 is attached. The paper sheet transport system 24 includes a set of takeup rollers 22*a*, 22*b* and 22*c*, a resist roller pair 26, a belt conveyor 27, an image fixing device comprising a fixing roller pair 28 and a paper sheet discharging roller pair 30.

The paper sheet P is fed from any one of the cassettes 21*a* and 21*b* and the feeder 21*c* to the resist roller pair 26 by the corresponding one of the takeup rollers 22*a*. The resist roller pair 26 suitable aligns a position of the paper sheet P and then feeds the paper sheet P into the image forming section 1 at a prescribed timing to the image forming operation of the image forming section 1. In the image forming section 1 the paper sheet P passes through a gap between the photosensitive drum 12 and the image transfer device 17, where an image on the photosensitive drum 12 is transferred onto the paper sheet P. The paper sheet P thus carrying the image then moves onto the belt conveyor 27. The belt conveyor 27 guides the paper sheet P to the image fixing device wherein the fixing roller pair 28 fixes the image onto the paper sheet P. The paper sheet P thus carrying the fixed image is discharged to the paper sheet receiving tray 23.

The image magnifying systme provides the image magnifying function which is adjustable within a prescribed range between a minimum image magnification ratio, e.g., 50 % and a maximum image magnification ration, e.g., 200 %. The image magnifying system is mainly constituted by the lens unit 14*h* in the optical system 14 and a system for controlling the position of the lens unit 14*h*. That is, the image magnification ratio is controlled by the position of the lens unit 14*h* along the light path between the third and the fourth mirrors 14*d* and 14*e*. The ratio of a first light path between the platen glass 31 and the lens unit 14 through the first to third mirrors 14*b*, 14*c* and 14*d* and a second light path between the platen glass 31 and the exposing position 12*a* on the photosensitive drum 12 through the six mirrors 14*b* to 14*g* and the lens unit 14*h* is varied in accordance with the position of the lens unit 14*h* so that the ratio gives the image magnification ratio.

Figure 2:
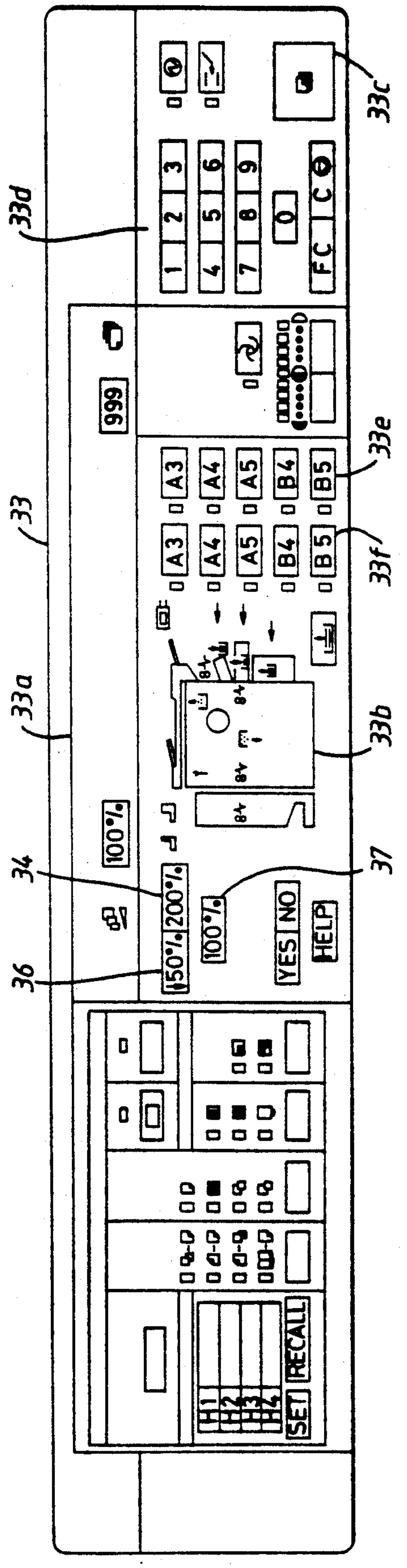
FIG. 2 is a plan of a control panel equipped on the image forming apparatus of FIG. 1.

The image magnification ratio is adjustable within the range by an operation through a control panel 33 which is equipped at a front top corner of the main body 11. FIG. 2 shows the detail of the control panel 33. As shown in FIG. 2, the control panel 33 includes a first display 33*a* and a second display 33*b*. The first display 33*a* displays a magnification ratio set by an operator, a variety of messages such as instruction messages for operators and the number of duplications to be made from the original 0. The second display 33*b* displays an operation phase of the image forming apparatus and a malfunction occurred in the image forming apparatus.

Further, the control panel 33 is provided with a copy key 33*c*, a ten-key pad 33*d*, a set of paper sheet size setting keys 33*e*, a set of original size setting keys 33*f*, a magnification ratio incrementing key 34, a magnification ratio decrementing key 36, a magnification ratio resetting key 37, etc. The copy key 33*c* causes the image forming apparatus to start the image forming operation when the key 33*c* is depressed. The ten-key pad 33*d* is used for designating an amount of copies to be duplicated from the original 0. The amount of copies is digitally displayed on the first display 33*a* and is decremented for every completion of the image forming operation to the paper sheet P. The paper sheet size setting key 33*e* is used for selecting the cassettes 21*a* and 21*b*. The original size setting key 33*f* used for designating a size of the original 0 laid on the platen glass 31. The magnification ratio incrementing key 34 causes the magnification ratio of the image magnifying system to be incremented when the key 34 is depressed. When the magnification ratio incrementing key 34 is kept depressed, the magnification ratio is continuously incremented up to the maximum image magnification ratio, e.g., 200%. The magnification ratio decrementing key 36 causes the magnification ratio of the image magnifying system to be decremented when the key 36 is depressed. When the magnification ratio decrementing key 36 is kept depressed, the magnification ratio is continuously decremented up to the minimum image magnification ratio, e.g., 50%. The magnification ratio resetting key 37 causes the magnification ratio of the image magnifying system to be reset to an equi-magnification ratio, i.e., 100% when the key 37 is depressed. A current magnification ratio set by the keys 34, 36 and 37 is also digitally displayed on the first display 33*a*.

Figure 3:
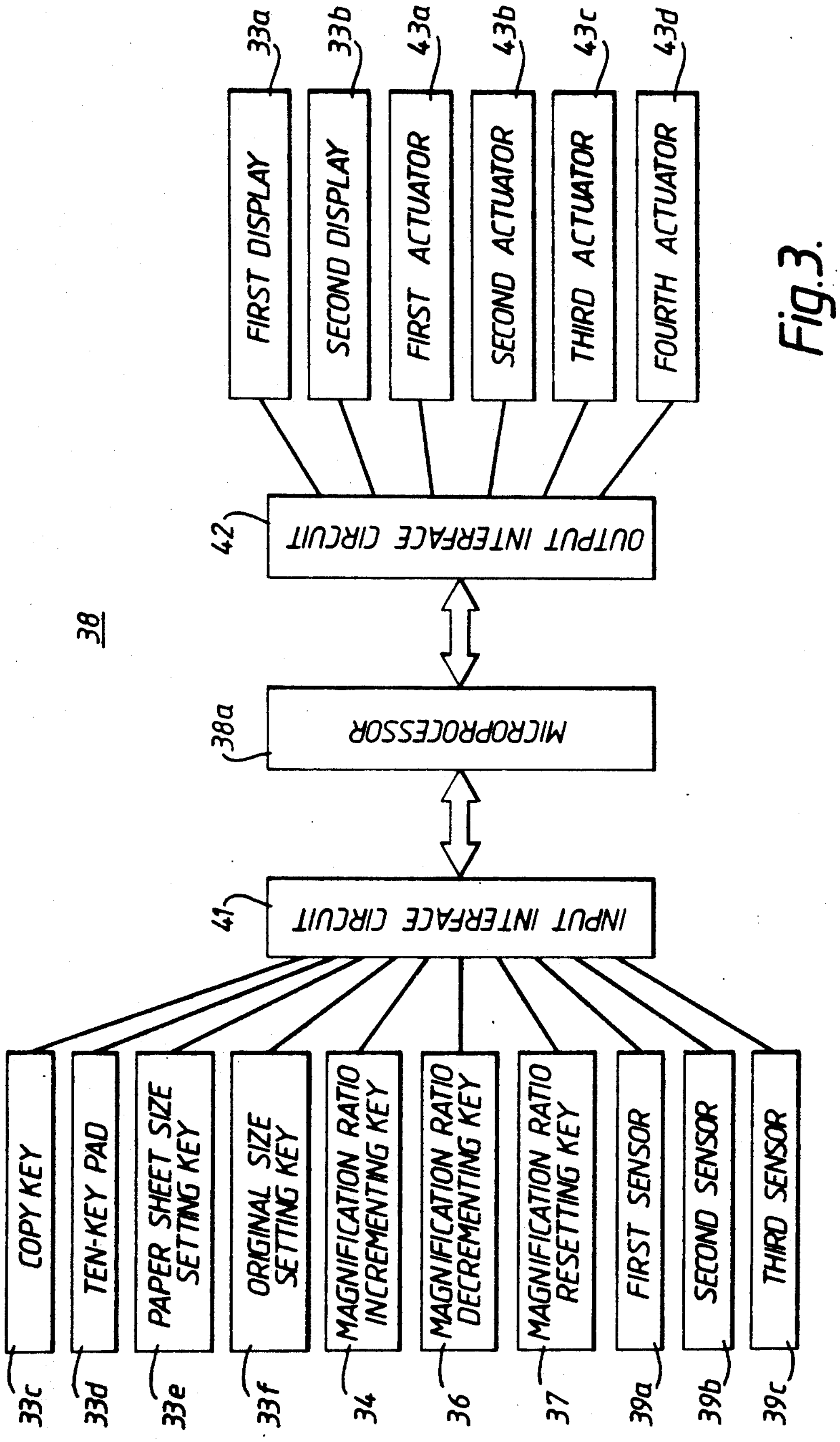
FIG. 3 is a block diagram showing a control circuit for the image forming apparatus of FIG. 1.

Referring now to FIG. 3, a control circuit 38 for controlling the image forming apparatus of FIG. 1 will be described. FIG. 3 shows a block diagram of the control unit 38. As shown in FIG. 3, the control circuit 38 includes a microprocessor 38*a*, a variety of input means, a variety of output means, an input interface circuit 41 and an output interface circuit 42.

The input means include the copy key 33*c*, the ten-key pad 33*d*, the paper sheet size setting key 33*e*, the original size setting key 33*f*, the magnification ratio incrementing key 34, the magnification ratio decrementing key 36, the magnification ratio resetting key 37 and sensors, e.g., a first sensor 39*a* for detecting a feed timing of the paper sheet P to the image forming section 1, a second sensor 39*b* for detecting a toner density in the image developing device 16, a third sensor 39*c* for detecting a light intensity on the exposing portion 12*a* of the photosensitive drum 12, etc. These keys 33*c*, 33*d*, 33*e*, 33*f*, 34, 36 and the sensors 39*a*, 39*b*, 39*c* are coupled to the microprocessor 38*a* through the input interface circuit 41.

The output means include the first display 33*a*, the second display 33*b*, a first actuator 43*a* for driving the scanner, a second actuator 43*b* for driving the lens unit 14*h*, a third actuator 43*c* for rotating the photosensitive drum 12, a fourth actuator 43*d* for driving toner feed rotors in the image developing device 16, etc. The displays 33*a*, 33*b* and the actuators 43*a* to 43*d* are coupled to microprocessor 38*a* through the output interface circuit 42.

Now the operation of the image forming apparatus will be described. In a normal status of the image froming apparatus the number of duplications and the image magnification ratio are automatically set to their standard values, i.e., the duplication number of [1] and the image magnification ratio of [100%]. The standard values [1] and [100%] are displayed on the first display 33*a* of the display panel 33. Further in the normal status a particular one of the cassettes 21*a* and 21*b*, e.g., the lower one 21*b* storing paper sheets with a most popular sheet size of [A-4] and a particular original size with also the most popular sheet size of [A-4] are automatically selected or designated. The selected or designated sheet size of [A-4] for the paper sheet P and the original O are also displayed by illumination lamps corresponding to [A4] keys in the paper sheet size setting keys 33*e* and the original size setting keys 33*f* on the display panel 33. In the normal state the first display 33*a* also displays a message of "COPY IS READY". Under this normal status, a standard image forming operation, i.e., an operation for obtaining one duplication of A4 size paper sheet P with the image magnification ratio of 100% from an A4 size original O is carried out by only depressing the copy key 33*c*.

In image forming operations other than the standard operation, it is required before depressing the copy key 33*c* for operators to set one or more of the particular values for the number of duplications and the image magnification ratio and the particular sheet sizes for the paper sheet P and the original O, through the ten-key pad 33*d*, the magnification ratio incrementing key 34, the magnification ratio decrementing key 36, the set of the paper sheet size setting keys 33*e* and the set of the original size setting keys 33*f*.

Further the image magnification ratio is able to be automatically set to a specific value given by a relationship between sizes of the original O and a selected paper sheet P. For example, when the [A.4] key in the set of paper sheet size setting keys 33*e* and the [A.3] key in the set of original size setting keys 33*f* are operated, the microprocessor 38*a* in the control circuit 38 calculates a suitable image magnification ratio of 71% for the image magnifying system by and the value of [71%] is displayed on the first display 33*a*. Further the lens unit 14*h* is moved to a position giving the image magnification ratio of 71% by the second actuator 43*b*. Thus, the image magnifying system and the image forming section become ready to carry out the image forming operation under the conditions set in the image forming apparatus so that the message "COPY IS READY" is displayed on the message display 33*a*. Thereafter, when operator depresses the copy key 33*c*, the image forming operation on the A4 size paper sheet P at the image magnification ratio of 71% is carried out in similar to the operation at the equi-magnification ratio.

Figure 4A:
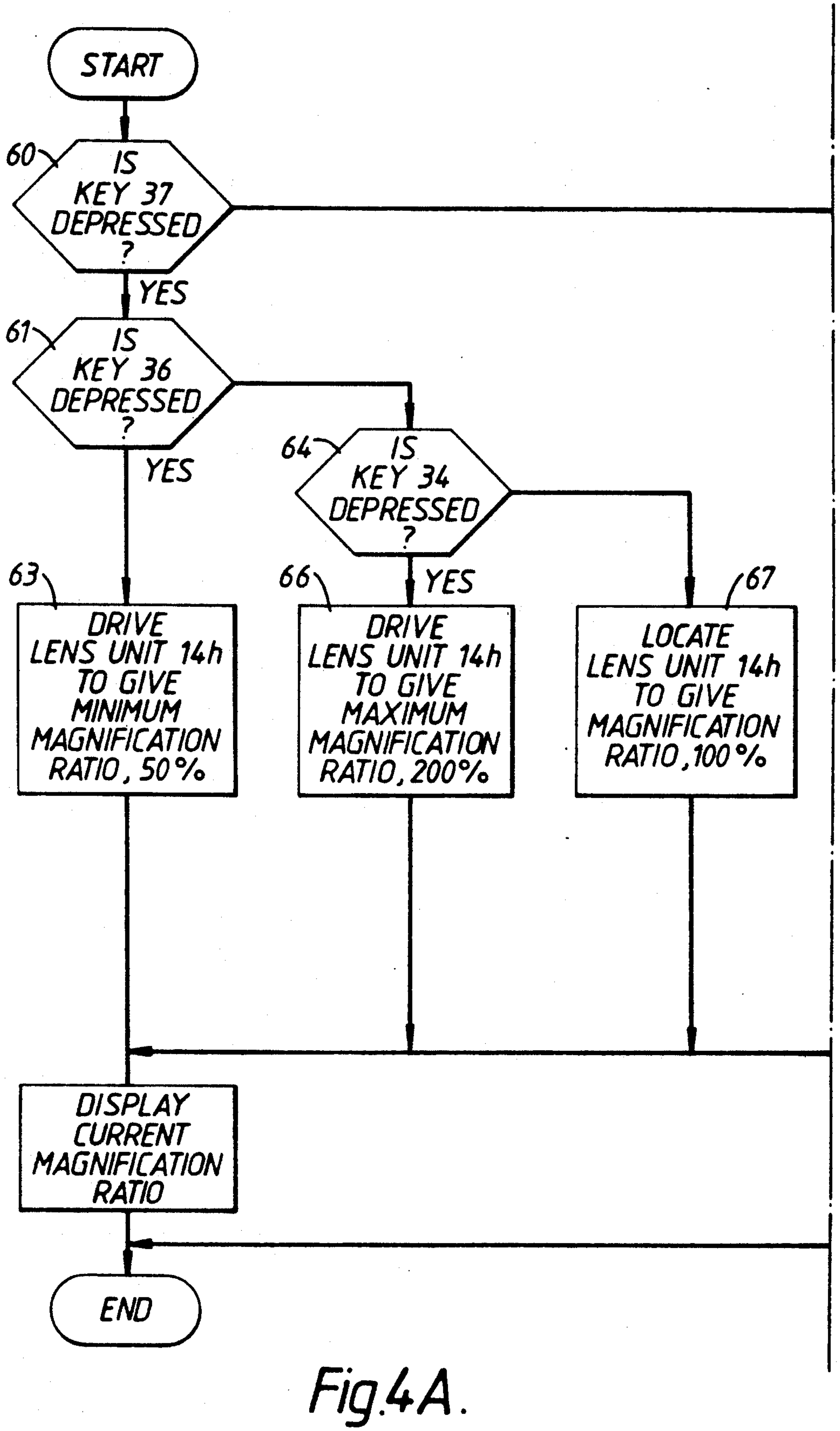
FIGS. 4A and 4B are a flowchart illustrating an operation for quickly setting a desired image magnification ratio in the control circuit of FIG. 3.
Figure 4B:
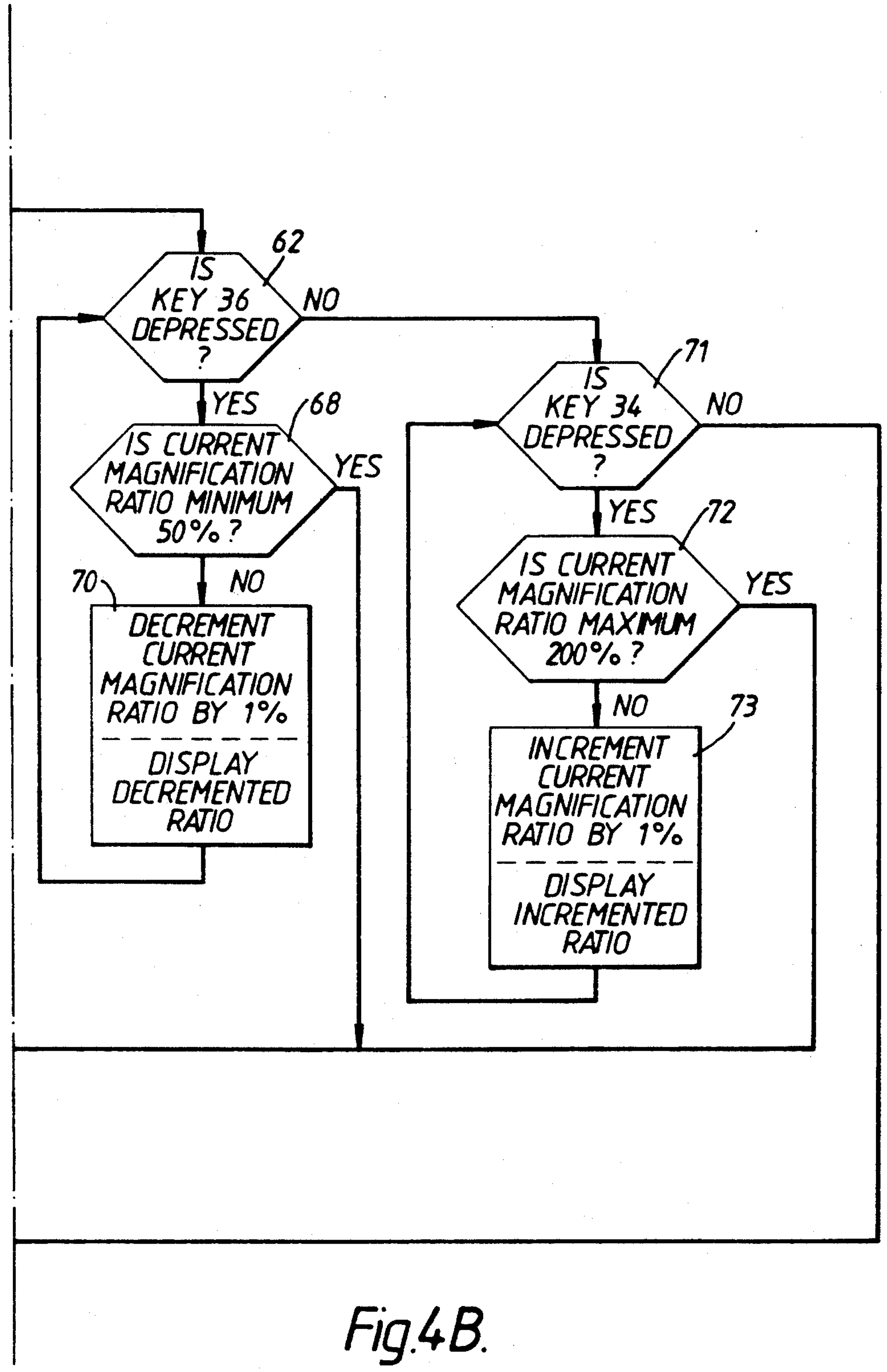

Referring now to FIG. 4, a quick setting of a desired image magnification ratio and the image forming operation carried out by the quick setting will be described. Here it is assumed that the number of duplications and the sizes of the paper sheet P and the original O have been automatically or manually set in the manner as described above.

In Step 60, the microprocessor 38*a* determines whether the magnification ratio resetting key 37 is depressed. If the magnification ratio resetting key 37 is depressed, the operation advances to Step 61. While if the magnification ratio resetting key 37 is not depressed, the operation advances to Step 62. In Step 61 the microprocessor 38*a* determines whether the magnification ratio decrementing key 36 is depressed. If the magnification ratio decrementing key 36 is depressed, the operation advances to Step 63. While if the magnification ratio decrementing key 36 is not depressed, the operation advances to Step 64.

That is, when both the magnification ratio resetting key 37 and the magnification ratio decrementing key 36 are depressed, the operation advances to Step 63 wherein the second actuator 43*b* drives fast the lens unit 14*h* to the position giving the minimum magnification ratio of 50%. Then, the operation advances to Step 69 wherein the image magnification ratio of 50% is displayed on the first display 33*a*. Thus the routine for quickly setting the minimum image magnification ratio of 50% completes.

In Step 64 the microprocessor 38*a* determines whether the magnification ratio incrementing key 34 is depressed. If the magnification ratio incrementing key 34 is depressed, the operation advances to Step 66. While if the magnification ratio incrementing key 34 is not depressed, the operation advances to Step 67.

That is, when both the magnification ratio resetting key 37 and the magnification ratio incrementing key 34 are depressed, the operation advances to Step 66 wherein the second actuator 43*b* drives fast the lens unit 14*h* to the position giving the maximum magnification ratio of 200%. Then, the operation advances to Step 69 wherein the image magnification ratio of 200% is displayed on the first display 33*a*. Thus the routine for quickly setting the maximum image magnification ratio of 200% completes.

When the magnification ratio resetting key 37 is depressed but both the magnification ratio decrementing key 36 and the magnification ratio incrementing key 34 are not depressed, the operation advances to Step 67 wherein the second actuator 43*b* locates the lens unit 14*h* in the position giving the equi-magnification ratio, i.e., 100%. Then, the operation advances to Step 69 wherein the image magnification ratio of 100% is displayed on the first display 33*a*. Thus the routine for quickly setting the image equi-magnification ratio completes.

In Step 62 the microprocessor 38*a* determines whether the magnification ratio decrementing key 36 is depressed. If the magnification ratio decrementing key 36 is depressed, the operation advances to Step 68. While if the magnification ratio decrementing key 36 is not depressed, the operation advances to Step 71. In Step 68 the microprocessor 38*a* determines whether a current image magnification ratio is set to the minimum image magnification ratio of 50%. If the current image magnification ratio is not set to the minimum image magnification ratio of 50%, the operation advances to Step 70.

In Step 70 the current image magnification ratio is decremented by 1% and the decremented image magnification ratio is displayed on the first display 33*a*. Then the operation returns to Step 62. Thus when the magnification ratio decrementing key 36 is kept depressed, the operations of Steps 62, 68 and 70 are repeated until the magnification ratio decrementing key 36 is released or the image magnification ratio reaches to the minimum image magnification ratio of 50%.

If in Step 68 the current image magnification ratio is set to the minimum image magnification ratio of 50%, the operation advances to Step 69 wherein the minimum image magnification ratio of 50% is displayed on the first display 33*a*. Thus the routine for decrementing the image magnification ratio to the minimum image magnification ratio of 50% completes.

In Step 71 the microprocessor 38*a* determines whether the magnification ratio incrementing key 34 is depressed. If the magnification ratio incrementing key 34 is depressed, the operation advances to Step 72. While if the magnification ratio incrementing key 34 is not depressed, the operation advances to END step for terminating the image magnifying operation. In Step 72 the microprocessor 38*a* determines whether a current image magnification ratio is set to the maximum image magnification ratio of 200%. If the current image magnification ratio is not set to the maximum image magnification ratio of 200%, the operation advances to Step 73.

In Step 73 the current image magnification ratio is incremented by 1% and the incremented image magnification ratio is displayed on the first display 33*a*. Then the operation returns to Step 71. Thus when the magnification ratio incrementing key 34 is kept depressed, the operations of Steps 71, 72 and 73 are repeated until the magnification ratio incrementing key 34 is released or the image magnification ratio reaches to the maximum image magnification ratio of 200%.

If in Step 72 the current image magnification ratio is set to the maximum image magnification ratio of 200%, the operation advances to Step 69 wherein the maximum image magnification ratio of 200% is displayed on the first display 33*a*. Thus the routine for incrementing the image magnification ratio to the maximum image magnification ratio of 200% completes.

That is, when the magnification ratio incrementing key 34 or the magnification ratio decrementing key 36 are depressed but the magnification ratio resetting key 37 is not depressed, the image magnification ratio is successively incremented or decremented until it reaches the maximum image magnification ratio of 200% or the minimum image magnification ratio of 50%. On the other hand, when the magnification ratio resetting key 37 is depressed together with any one of the magnification ratio incrementing key 34 and the magnification ratio decrementing key 36, the image magnification ratio is immediately set to the maximum image magnification ratio of 200% or the minimum image magnification ratio of 50% without passing through the so slowly operated incrementing or decrementing routine.

Further, when a particular image magnification ratio far from the equi-magnification ratio, i.e., 100% but relatively close to the maximum or minimum image magnification ratio 200% or 50%, i.g., 180% is requested, after once setting quickly the maximum image magnification ratio of 200% by depressing both the magnification ratio resetting key 37 and the magnification ratio incrementing key 34, the magnification ratio can be decremented to the requested magnification ratio of 180% by keeping depressed the magnification ratio decrementing key 36 until the current magnification ratio reaches to 180%. As a result, the time for setting the requested magnification ratio of 180% is very shortened in comparison to the time in the conventional manner that the magnification ratio incrementing key 34 is kept depressed until the current magnification ratio reaches the requested magnification ratio of 180%.

When the desired image magnification ratio is thus set by the above described routines, the second actuator 43*b* in the control circuit 38 drives the lens unit 14*h* to the position giving the desired magnification ratio, and also the message "COPY IS READY" is displayed on the first display 33*a*. Thus the image forming operation at the magnification ratio is carried out in the manner in similar to the image forming operation as the equi-magnification ratio, when the copy key 33*c* is depressed.

According to the arrangement described above, not only the maximum and the minimum image magnification ratios but also other magnification ratios relatively close to the maximum and the minimum image magnification ratios are able to be quickly set by depressing the magnification ratio resetting key 37 together with the magnification ratio incrementing key 34 or the magnification ratio decrementing key 36. Thus the time for completing the setting to the relatively large or small magnification ratio is very shortened so that an operability of the image forming apparatus is remarkable improve.d According to the embodiment of the present invention, the magnification ratio resetting key 37 which is conventionally used for resetting the image magnification ratio to the equi-magnification ratio, i.e., 100%, is used for the quick setting to the maximum and the minimum image magnification ratios. In other words, the embodiment of the image forming apparatus is able to effect the quick setting to the maximum and the minimum image magnification ratios without complicating the construction of the control panel, i.e., without providing any new operation key. The new arrangement of the embodiment for effecting the quick setting to the maximum and the minimum image magnification ratios is constructed by the control circuit 38 in which the microcomputer 38*a* controls the second actuator 43*b* for driving the lens unit 14*h* in response to the depressions of both the magnification ratio resetting key 37 and the magnification ratio incrementing key 34, or both the magnification ratio resetting key 37 and the magnification ratio decrementing key 36.

The present invention is not limited to the above embodiment. That is, various modifications are applicable to the present invention without departing from the principal of the present invention. For example, another key such as a key in the ten-key pad 33*d* can be used for initiating the quick setting to the maximum and the minium image magnification ratios, in place of the magnification ratio resetting key 37. Furthermore, it is also possible to provide a new operation key devoted for initiating the quick setting to the maximum and minimum image magnification ratios, other than the use of the magnification ratio resetting key 37. In addition, it is easily understood that the maximum image magnification ratio and the minimum image magnification ratio are not limited to the values, 200% and 50% as mentioned above.

As described above, the present invention can provide an extremely preferable image forming apparatus.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention include all embodiments falling within the scope of the appended claims.

What is claimed is:

1. An image forming apparatus, comprising:

means for forming a copy image on the basis of an original image under each of a plurality of image forming conditions including a plurality of magnification ratios;

first key means for inputing the change of magnification ratio from first magnification ratio to second magnification ratio;

second key means for inputing one of the image forming conditions;

first setting means for setting the second magnification ratio to the magnifcation ratio in accordance with first changing ratio when only the first key means is operated; and second setting means for setting the second magnification ratio to the magnification ratio in accordance with second changing ratio different from the first changing ratio when both the first key means and the second key means are operated.

2. The image forming apparatus according to claim 1, wherein the second setting means includes means for establishing the second magnification ratio as the magnification ratio in accordance with second changing ratio different from the first changing ratio when both the first key means and the second key means are simultaneously operated.

3. The image forming apparatus according to claim 1, wherein the second setting means includes two selectably operable means for respectively incrementing and decrementing the image magnification ratio of the image magnifying means.

4. The image forming apparatus according to claim 3, wherein the image magnifying means includeds means for varying the image magnification ratio within a range defined by a prescribed maximum value and a prescribed minimum value and the image forming condition setting means includes means for resetting the image magnification ratio to an intermediate value lying between the maximum and the minimum values.

5. The image forming apparatus according to claim 4, wherein the controlling means includes means for controlling the image magnifying means so that the image magnification ratio is set to the maximum value of the image magnification ratio when both the resetting means and the incrementing means for the image magnification ratio are operated.

6. The image forming apparatus according to claim 4, wherein the controlling means includes means for controlling the image magnifying means so that the image magnification ratio is set to the minimum value of the image magnification ration when both the resetting means and the decrementing means for the image magnification ratio are operated.

7. An image forming apparatus, comprising:

means for forming a copy image on the basis of an original image under each of a plurality of image forming conditions including a plurality of magnification ratios;

first key means for inputing the change of magnification ratio from first magnification ratio to second magnification ratio;

second key means for inputing one of the image forming conditions different from the first inputing means;

first setting means for setting the first magnification ratio when only the first key means is operated; and second setting means for setting the second magnification ratio different from the first magnification ratio when both the first key means and the second key means are operated.

8. The image forming apparatus according to claim 7, wherein the second setting means includes for establishing the second magnification ratio as the magnification ratio in accordance with second changing ratio different from the first changing ratio when both the first key means and the second key means are simultaneously operated.

9. The image forming apparatus according to claim 7, wherein the first setting means includes means for setting a copy image forming condition for the image forming means and the second setting means includes two selectably operable means for respectively incrementing and decrementing the image magnification ratio of the image magnifying means.

10. The image forming apparatus according to claim 9, wherein the image magnifying means includes means for varying the image magnification ration within a range defined by a predetermined maximum value and a prescribed minimum value and the image forming condition setting means includes means for resetting the image magnification ratio to an intermediate value lying between the maximum and the minimum values.

11. The image forming apparatus according to claim 10, wherein the controlling means includes means for controlling the image magnifying so that the image magnification ratio is set to the specific value the same as the maximum value of the image magnification ratio when both the resetting means and the incrementing means for the image magnification ratio are operated.

12. The image forming apparatus according to claim 10, wherein the controlling means includes means for controlling the image magnifying means so that the image magnification ratio is set to the specific value as the minimum value of the image magnification ratio when both the resetting means and the decrementing means for the image magnification ratio are operated.

13. An image forming apparatus, comprising:

an image forming section for forming a copy image;

an image magnifying system for magnifying the image to be formed by the image forming section;

a microprocessor means for controlling the image magnifying means to vary the image magnification ration of the image magnifying system;

first key means for enabling the microprocessor means means;

second key means for causing the microprocessor means to control the image magnifying section so that the image magnification ratio is varied by a first amount of change in an every action of the second key means; and means for energizing the image forming section so as to form the copy image under the magnification condition set by the first key means or the second key means;

wherein the microprocessor means controls the image magnifying system so that the image magnification ratio is changed by a second amount of change varied in response to a copy image magnification ratio currently set to the image magnifying system instead of causing the first amount of change when both the first key means and the second key means are operated.

14. The image forming apparatus according to claim 13, wherein the image magnifying system includes means for varying the image magnification ratio within a range defined by a prescribed maximum value and a prescribed minimum value and the first key means includes a key for resetting the image magnification ratio to an intermediate value lying between the maximum and the minimum values.

15. The image forming apparatus according to claim 13, wherein the first key means includes a first key for resetting the magnification ratio of the image magnification system to a prescribed magnification ratio and the second key means includes second and third selectably operable keys for respectively incrementing and decrementing the image magnification ratio of the image magnifying system.

16. The image forming apparatus according to claim 15, wherein the microprocessor means includes a microprocessor for controlling the image magnifying system so that the image magnification ratio is set to the maximum value of the image magnification ratio when both the first key and the second key for incrementing the image magnification ratio are operated.

17. The image forming apparatus according to claim 15, wherein the microprocessor means includes a microprocessor for controlling the image magnifying system so that the image magnification ratio is set to the minimum value of the image magnification ratio when both the first key and the third key for decrementing the image magnification ratio are operated.

* * * * *